US012382878B2

(12) United States Patent
Theisen

(10) Patent No.: US 12,382,878 B2
(45) Date of Patent: Aug. 12, 2025

(54) LIGHT-EMITTER DEVICE AND METHOD FOR PROMOTING GRASS GROWTH

(71) Applicant: Rhenac Greentec AG, Hennef (DE)

(72) Inventor: Horst Theisen, Bonn (DE)

(73) Assignee: Rhenac Greentec AG, Hennef (DE)

(*) Notice: Subject to any disclaimer, the term of this patent is extended or adjusted under 35 U.S.C. 154(b) by 0 days.

(21) Appl. No.: 16/064,803

(22) PCT Filed: Dec. 21, 2016

(86) PCT No.: PCT/EP2016/082263
§ 371 (c)(1),
(2) Date: Jun. 21, 2018

(87) PCT Pub. No.: WO2017/109008
PCT Pub. Date: Jun. 29, 2017

(65) Prior Publication Data
US 2019/0000020 A1    Jan. 3, 2019

(30) Foreign Application Priority Data

Dec. 21, 2015   (DE) .................. 102015016669.7
Dec. 21, 2015   (DE) .................. 202015008738.8

(51) Int. Cl.
| | | |
|---|---|---|
| A01G 7/04 | (2006.01) | |
| E01C 13/08 | (2006.01) | |
| H05B 45/00 | (2022.01) | |
| H05B 45/10 | (2020.01) | |

(52) U.S. Cl.
CPC ............ A01G 7/045 (2013.01); E01C 13/083 (2013.01); H05B 45/00 (2020.01); H05B 45/10 (2020.01); *Y02P 60/14* (2015.11)

(58) Field of Classification Search
CPC ........ A01G 7/045; A01G 9/249; E01C 13/083
See application file for complete search history.

(56) References Cited

U.S. PATENT DOCUMENTS

| | | | |
|---|---|---|---|
| 4,876,647 A | 10/1989 | Gardner et al. | |
| 10,667,469 B2* | 6/2020 | Van Gemert | ........ A01G 9/245 |
| 2010/0259931 A1* | 10/2010 | Chemel | ................. F21V 17/02 |
| | | | 362/249.02 |
| 2010/0287830 A1 | 11/2010 | Chen et al. | |

(Continued)

FOREIGN PATENT DOCUMENTS

| | | |
|---|---|---|
| CN | 204201522 U | 3/2015 |
| WO | 2009124577 A1 | 10/2009 |
| WO | 2012147391 A1 | 11/2012 |

OTHER PUBLICATIONS

GrowAce, https://growace.com/blogs/learning-center/do-you-need-infrared-light-in-your-grow-room (Year: 2022).*

(Continued)

*Primary Examiner* — Matthew J. Peerce
(74) *Attorney, Agent, or Firm* — Buchanan Ingersoll & Rooney PC

(57) ABSTRACT

The invention relates to a light-emitting device for promoting grass growth, in particular of sports turf, wherein the device comprises at least one LED circuit board and a control/regulating unit having at least three channels. The light-emitting device can be mounted on light support units and be moved over the lawn.

14 Claims, 2 Drawing Sheets

(56) References Cited

U.S. PATENT DOCUMENTS

| | | | |
|---|---|---|---|
| 2011/0115385 A1* | 5/2011 | Waumans | A01G 7/045 |
| | | | 315/152 |
| 2013/0294065 A1* | 11/2013 | Wells | F21K 9/00 |
| | | | 362/231 |
| 2015/0271876 A1* | 9/2015 | Bowers | H05B 6/80 |
| | | | 219/702 |
| 2015/0305108 A1 | 10/2015 | Probasco | |
| 2016/0262313 A1* | 9/2016 | Szeto | A01G 7/045 |
| 2020/0060105 A1* | 2/2020 | Tsivikis | A01G 25/09 |

OTHER PUBLICATIONS

EnergyEducation, "Radiant Heat", Nov. 23, 2015 as established by waybackmachine, https://energyeducation.ca/encyclopedia/Radiant_heat (Year: 2015).*

International Search Report by the International Searching Authority for PCT/EP2016/082263 dated Mar. 24, 2017 (German Translation).

\* cited by examiner

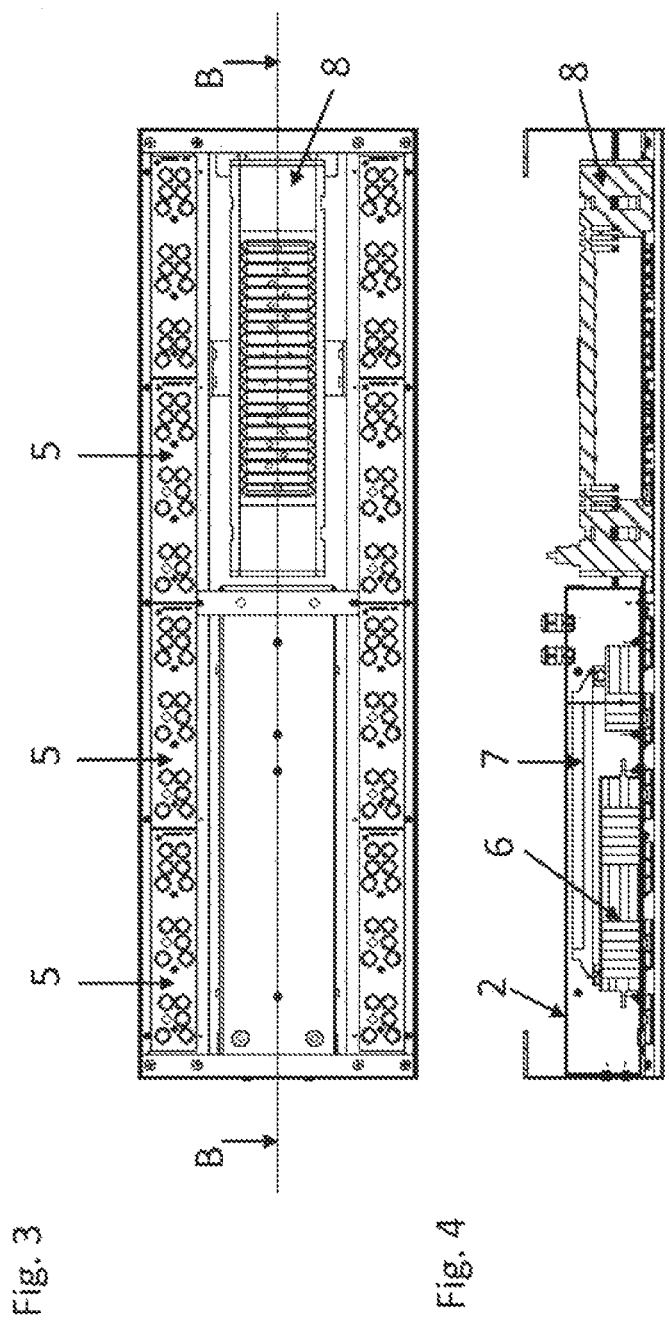

LIGHT-EMITTER DEVICE AND METHOD FOR PROMOTING GRASS GROWTH

CROSS-REFERENCE TO RELATED APPLICATION

This is a national stage application of PCT Application No. PCT/EP2016/082263 filed on Dec. 21, 2016, published as WO2017109008 (A1), which claims priority to German patent applications 10 2015 016 669.7 filed on Dec. 21, 2015 and 20 2015 008 738.8 filed on Dec. 21, 2015. The entire content of those applications is incorporated herein by reference.

FIELD OF THE INVENTION

The invention relates to improving growth of turf grass through the use of artificial light.

BACKGROUND OF THE INVENTION

The structural engineering of sports arenas very often leads to a low incidence of light in the stadium body. As a result, the grass patches laid in the stadium are given too little light. The sport turf needs a certain amount of light for its rate of photosynthesis and growth. The amount of light provided must be above the light compensation point of the turf plant. The light compensation point is the amount of light intensity on the light curve where the rate of photosynthesis exactly matches the rate of respiration. At this point, the uptake of $CO_2$ through photosynthetic pathways is exactly matched to the respiratory release of carbon dioxide, and the uptake of $O_2$ by respiration is exactly matched to the photosynthetic release of oxygen.

Sports arenas are becoming increasingly busy. Sports events take place at intervals of usually a few days. Other major events are also held on the lawn during which the sports turf must be covered. The many events can increase the time required to regenerate the sports turf. In addition, the problem of the low availability of light causes damage to the turf plants.

For several years now, more and more artificial light sources have been placed over the lawns to provide the lawn with light. The sources of light may be sodium high-pressure lamps. These lamps are operated with power ratings of 400 W-1000 W. Due to their emission maximum, sodium high pressure vapor lamps are well suited as supplementary exposure (assimilation light) in ornamental plant cultivation. In addition to broadening the Na emission lines in the yellow region (590 nm), these lamps also have a line in the red (670 nm) region, as shown in FIG. 1. The rate of photosynthesis of the grass plants, depending on the plant species, is in the range of 445-460 nm (blue) and 630-670 nm (red), as shown in FIG. 2.

The sodium high-pressure lamps currently in use have a number of adverse properties that affect the quality of the sports grass and the energy balance of the sports arena. For example, only about 8-10% of the connected load of 1000 W is converted into visible light. The rest of the introduced energy is converted into heat radiation. Of the approximately 8-10% of visible light, only the part located in the 630 nm-665 nm range will then be used by the lawn for photosynthesis.

The portion of the energy used that is converted into heat radiation can heat the lawn and the ground and is useful for heating the lawn in winter. The lawn may contain a layer of quartz sand which will retain heat. The heat radiation is stored by a lawn carrying a layer of quartz sand thus increasing the temperature on the turf root and the lawn leaf. This temperature behavior is beneficial on cold winter days, but poor for the turf root in most of the time of artificial radiation. The turf root needs more water or grows slowly, which can cause the lawn leaf to burn.

The high pressure sodium powered lawn growth emitters are usually mounted on mobile light carrier units during the exposure time with the light carrier units being moved and positioned over the lawn at intervals. During this time, the lawn can neither be fertilized nor irrigated. Because sodium high-pressure lamps cannot be throttled or dimmed in their performance while in use the total heat radiation they give off (at 1000 W approx. 900 W) can burn the sports turf. The lawn bearing layer of quartz stores the heat and the lawn leaves can burn without adequate irrigation. In addition, lawn seed may be repeatedly applied to the lawn to improve the lawn. These seeds are exposed to the waste heat of the light units which can cause the seeds to not germinate properly.

An object of the invention is to overcome the drawbacks of the conventional exposure systems described above and, in particular, to provide an intelligent light irradiation, which uses only as much energy as is currently necessary to enable the condition for the lawn growth under energetically optimal conditions. A further object of the invention is to optimally adjust the light irradiation to the ambient temperature and/or the light-spectral composition which is needed in situ. Another object of the invention is to preserve the quality of the lawn during the year over 12 months and especially in the winter months. These objectives can be achieved by a light-emitting device according to the invention and a method for promoting turf growth according to the independent claims. In the dependent claims advantageous refinements and preferred embodiments are given.

SUMMARY OF THE INVENTION

A light-emitting device is provided for promoting lawn growth, in particular of sports lawns, wherein the device has at least one LED board and a control unit which comprises at least three channels. The light-emitting device can be mounted on light carrier units and moved across the lawn.

According to the invention, the light-emitting device has an LED board, which may be equipped with integrated circuits and special LED recordings for receiving individual LEDs.

According to an advantageous embodiment of the light-emitting device according to the invention, the control unit has at least six or eight, or at least 10 or 12 channels.

According to an advantageous embodiment of the light-emitting device according to the invention, the device has at least one LED and/or a UV-LED and/or an OLED (organic light-emitting diode), which for example preferably have wavelengths in the blue, red and/or in the UV spectral range.

According to a further advantageous embodiment the light-emitting device can be operated in conjunction with a spectrometer so that only the respective light spectrum is emitted which is currently absent from the lawn or is currently desired for a particular lawn zone.

In a method for promoting turf growth, in particular of sports turf, a need-based composition of light spectra and/or intensities for use for turf irradiation with artificial light is set by means of the light-emitting device, and the turf is then irradiated with this composition.

BRIEF DESCRIPTION OF THE DRAWINGS

FIG. 3 is a schematic representation of a present preferred embodiment the light-emitting device according to the invention in plain view from below.

FIG. 4 is a sectional view taken along the line B-B of FIG. 3.

DESCRIPTION OF THE PREFERRED EMBODIMENTS

Figure 1:
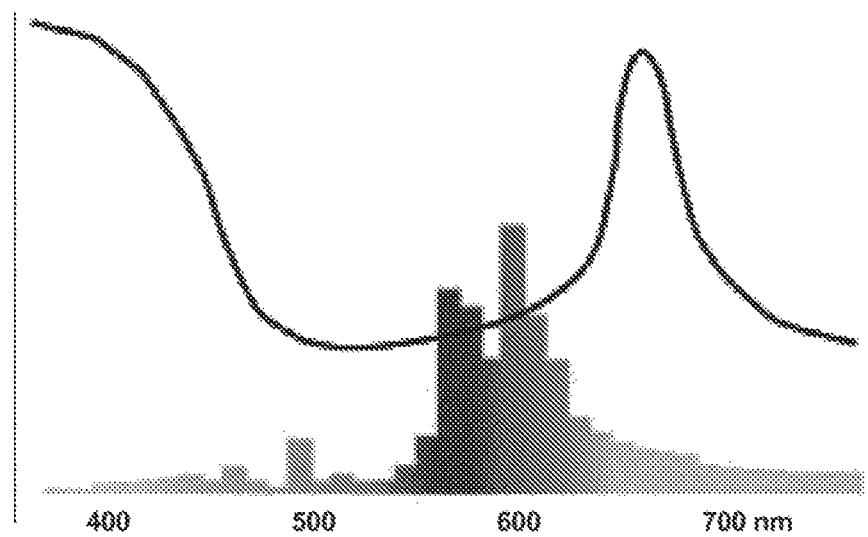
FIG. 1 shows an absorption spectrum of a prior art sodium high pressure vapor lamp with peak 630 nm.
Figure 2:
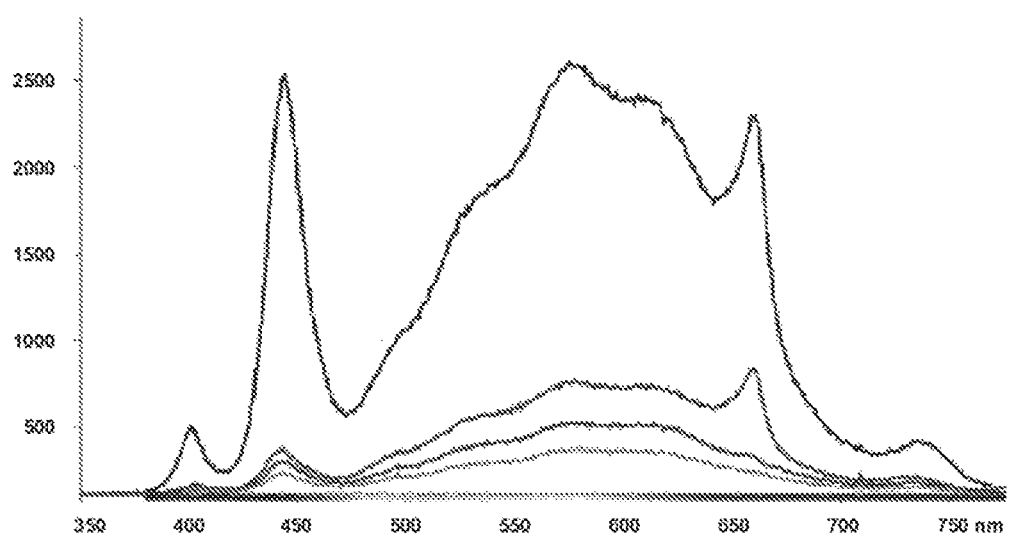
FIG. 2 is an absorption spectrum of a turf plant with peak at 440 nm and 640 nm.

Referring to FIG. 3 and FIG. 4 an embodiment of the light beam emitting device according to the invention has at least one LED board 5 and a control unit 7 which comprises at least three channels. The device also has a power supply 6, and at least one IR heat radiator 8. The light device can be mounted on light carrier units (not shown) and moved across the lawn. Advantageously, these light carrier units are adjustable in height, whereby the light beam device can be arranged at a height of at least 200 mm, preferably from a minimum of 500 mm to a maximum of 2500 mm, more preferably to a maximum of 1800 mm above the turf surface. The exact positioning of the light carrier units can be done manually and/or fully automatically by the tiller.

The LED board 5 may be equipped with integrated circuits and special LED recordings for receiving individual LEDs or instructions for activating individual LEDs. Furthermore, the light-emitting device 8 has a control unit, which can be designed, for example, as a control circuit board. The control unit monitors the temperature behavior of the LEDs on the board and, in the event of over temperature, regulates the power at the LEDs.

The control unit can have several channels, each of which can control selected set of LEDs on the LED board. There can be one or more than one LED in a corresponding circuit, that is or are operated on a channel.

The control unit preferably has at least six or eight, or at least 10 or 12 channels. The channels can be suitable for regulating the individual wave spectra from 0-100%. This regulation makes it possible to provide exactly that light spectrum (wavelengths) which the lawn needs, in order to be able to grow optimally. For example, the lawn needs more red light (630-660 nm) in the germination phase, or if it is to grow faster, or it needs more blue light (440-460 nm) to form stronger cell structures, as stronger cell structures increase the stress capacity of the sports grass.

The light spectrum of the day changes over the day and during the course of the year. See for example standard light curve D65. The spectral composition of the natural light that falls on the sports lawn, can be supplemented by the light-emitting device according to the invention, as required by the lawn for the respective growth phase.

The light-emitting device according to the invention has at least one LED and/or a UV-LED and or an OLED (organic light-emitting diode), which for example preferably have wavelengths in the blue, red and/or in the UV spectral range. Preferably, however, there is at least one UV LED with peak at 395 nm, and/or at least one LED with peak at 440 nm and/or at least one LED with peak at 660 nm.

The light-emitting device may be equipped with eight LED boards each having 40 W. together with a main transformer resulting in a maximum connected load of approx. 350 W. At least about 15% of this 350 W connected load is converted into light that is suitable for synthesis. The emitted light is tuned to the photosynthetic rate of the plant and is fully converted into biomass, length growth, root growth, rooting and strengthening of cell structures. According to an advantageous embodiment of the light-emitting device according to the invention, the latter also has an IR heat radiator, which can be designed, for example, in the form of a heat radiation bar. This IR radiant heater can be switched on in the winter months and can thus increase the leaf temperature of the lawn, in addition to the root temperature for the lawn. In this case, the IR heat radiator can be connected to the control unit of the light-emitting device or can be connected to a separate control unit that is controlled by the control unit.

The light-emitting device can also have an IR-sensing probe temperature transmitter. The IR temperature sensor scans the lawn surface by means of an IR beam and reports the detected temperature of the control unit of the light-emitting device according to the invention. The control unit then compares this value, which may be in the range of 0-10 V, with a stored nominal value and then—depending on the nominal-actual adjustment—generates an output signal. The output signal can again be between 0 and 10V. This output signal is in turn converted by a DMX converter (digital multiplexer), which may also be part of the light-emitting device according to the invention, from 0-10 V to DMX. Here 0-10 V corresponds to a value of 1-255. Via the DMX converter, a value of 0-255 is transmitted to a power dimmer, which may also be included in the light-emitting device according to the invention.

The power dimmer can do this with a phase angle dimmer or a phase dimmer. The power dimmer then regulates the output of the IR radiant heater.

Preferably the control unit can also absorb light intensities in the same way and thus ensure that exactly the desired light spectrum in the desired intensity and composition suitable for use for lawn irradiation with artificial light is used.

The light-emitting device can be operated in conjunction with a spectrometer so that only the respective light spectrum is emitted which is currently absent from the lawn or is currently desired for a particular lawn zone, for example light for rapid germination after sowing in heavily used playing field areas.

The light-emitting device can be individually attached and operated on a single suspension or on any support unit. The light-emitting device can be combined with other light-emitting devices to form a system.

The present light-emitting device has several advantages over conventional lighting systems with gas discharge lamps. As can be seen from Table 1, about 35% of the power of a high-pressure sodium discharge lamp of the prior art (SdT) generates about 3 times as much photosynthesis-active light with the light-emitting device according to the invention.

TABLE 1

| Light Type | Power Consumption | Photosynthesis usable light at 1,850 mm Light Point Height |
|---|---|---|
| High-Pressure Sodium Discharge Lamp (Sdt) | 1,000 Watt | Ca. 65 $\mu mol/m^2$ s-1 |
| Light-emitting Device of the Invention | 350 Watt | Ca. 185 $\mu mol/m^2$ s-1 |

The invention additionally has a method for promoting turf growth, in particular of sports turf, by means of a light-emitting device. Using this method, a need-based composition of light spectra and/or intensities for use for turf irradiation with artificial light is set by means of the light-emitting device, and the turf is then irradiated with this composition.

If the light-emitting device additionally comprises an IR heat radiator 8, an IR-sensing probe temperature transmitter, a DMX converter and a power dimmer, the lawn surface is scanned by the IR temperature sensor by means of an IR beam and transmits the detected temperature to the control unit. Subsequently, with this temperature value, a set point-actual adjustment is carried out in order to determine a control value which is converted into an output signal. The output signal in turn is then converted by a DMX converter to DMX. Subsequently, the converted value is transferred from the DMX converter to the power dimmer, which in turn subsequently regulates the output of the IR heat radiator.

The control unit may perform the target-actual adjustment with values of 0-10 V, wherein the output signal can be between 0 and 10 V and/or wherein the DMX converter implements the output signal of 0-10 V in values of 1-255. The DMX converter can then transfer a value of 0-255 to the power dimmer.

If the light-emitting device additionally has a spectrometer, light spectra can be measured according to a further advantageous embodiment of the method according to the invention, and subsequently only the respective light spectrum is currently emitted which the lawn currently lacks or is currently desired.

The invention claimed is:

1. A light-emitting device for promoting grass growth, in a sports turf comprising:
    at least one LED board containing a plurality of sets of LEDs, the LEDs in each set of LEDs capable of emitting light spectra that corresponds to only one color, at least one set of LEDs capable of emitting blue light and at least one other set of LEDs capable of emitting red light,
    a control unit,
    an IR-sensing probe temperature transmitter connected to the control unit for transmitting to the control unit a signal corresponding to a temperature of the sports turf found by the IR-sensing probe temperature transmitter,
    an IR radiant heater, which is not a plurality of LEDs, the IR radiant heater having a power dimmer connected to the control unit, and
    a power source connected to the control unit, the at least one LED board and the IR radiant heater,
    wherein the control unit activates the at least one LED panel and controls the amount of heat radiated from the IR radiant heater when the IR radiant heater is positioned above the sports turf by regulating radiant heat output of the IR radiant heater to achieve and maintain a desired sports turf temperature as measured by the IR-sensing probe temperature transmitter while light from the at least one LED panel which is activated by the control unit is directed toward the sports turf.

2. The light-emitting device according to claim 1, wherein the at least one LED board has at least one integrated circuit connected to the LEDs in at least one of the sets of LEDs.

3. The light-emitting device according to claim 1 wherein the control unit is a control board.

4. The light-emitting device according to claim 3 wherein the control board contains at least three channels.

5. The light-emitting device according to claim 1, the at least one LED board comprising at least one of an LED, a UV LED or an OLED.

6. The light-emitting device according to claim 1 wherein the LED board comprises at least one UV LED having a peak at 395 nm, at least one LED having a peak at 440 nm and at least one LED having a peak at 660 nm.

7. The light-emitting device according to claim 1 also comprising at least one of a measuring unit, a spectrometer, and a DMX converter connected to the control unit.

8. The light-emitting device according to claim 1 wherein the IR radiant heater is a heat radiation bar.

9. A method for promoting turf growth of a sports turf comprising:
    providing a light-emitting device comprised of at least one LED board containing a plurality of sets of LEDs, the LEDs in each set of LEDs capable of emitting light spectra that
    corresponds to only one color, at least one set of LEDS capable of emitting blue light and at least one other set of LEDs capable of emitting red light, a control unit, an IR radiant heater with a power dimmer connected to the control unit, an IR-sensing probe temperature transmitter connected to the control unit and a power source connected to the control unit, the IR-sensing probe temperature transmitter and the at least one LED board, wherein the control unit has at least three channels, each channel capable of controlling power to LEDs in at least one of the plurality of sets of LEDs and no two channels of the at least three channels are capable of controlling power to the same LEDs,
    positioning the light emitting device adjacent the sports turf so that light emitted from the LEDs and heat from the IR radiant heater are directed toward the sports turf,
    the IR-sensing probe temperature transmitter sensing a temperature of the sports turf and transmitting that temperature to the control unit,
    selecting light spectra and intensities needed by the sports turf and a desired temperature of the sports turf,
    providing power to those sets of LEDs that emit the selected light spectra and intensities which is directed toward the sports turf, and
    applying heat to the sports turf using the IR radiant heater with a power dimmer to achieve and maintain the desired temperature as measured by the IR-sensing probe temperature transmitter while providing power to the sets of LEDs that emit the selected light spectra and intensities which is directed toward the sports turf.

10. A method according to claim 9 wherein the light-emitting device additionally comprises a DMX converter and wherein the IR-sensing probe temperature transmitter, —by means of an IR beam, scans the sports turf and transmits detected temperatures to the control unit, and then performs a target-actual adjustment with this temperature value, so as to determine a control value, which is converted into an output signal, the output again is converted by the DMX converter to DMX, and then the converted value is transmitted from the DMX converter to the power dimmer, which then controls the output of the IR radiant heater.

11. The method according to claim 10, wherein the control unit performs the target-actual adjustment with values of 0-10 V, the output signal is between 0 and 10 V, the DMX converter converts the output signal of 0-10 V into values of 1-255, and the DMX converter transmits a value of 0-255 to the power dimmer.

12. The method according to claim 9 wherein the light-emitting device additionally comprises a spectrometer that measures light spectra and then only selected light spectrum is emitted.

13. The method according to claim 12 wherein the selected light spectra is determined by a condition of the sports turf which indicates that the selected light spectra will aid growth.

14. The method according to claim 9 wherein the IR radiant heater is a heat radiation bar.

\* \* \* \* \*